Nov. 5, 1957 T. R. HARRISON 2,811,856
TEMPERATURE MEASURING APPARATUS
Filed March 29, 1946 5 Sheets-Sheet 1

INVENTOR.
THOMAS R. HARRISON

Nov. 5, 1957 T. R. HARRISON 2,811,856
TEMPERATURE MEASURING APPARATUS
Filed March 29, 1946 5 Sheets-Sheet 4

FIG. 7

*INVENTOR.*
THOMAS R. HARRISON
BY *Arthur H. Swanson*
ATTORNEY.

Nov. 5, 1957 T. R. HARRISON 2,811,856
TEMPERATURE MEASURING APPARATUS
Filed March 29, 1946 5 Sheets-Sheet 5

INVENTOR.
THOMAS R. HARRISON
BY Arthur H. Swanson
ATTORNEY.

United States Patent Office 2,811,856
Patented Nov. 5, 1957

2,811,856

TEMPERATURE MEASURING APPARATUS

Thomas R. Harrison, Wyncote, Pa., assignor, by mesne assignments, to Minneapolis-Honeywell Regulator Company, Minneapolis, Minn., a corporation of Delaware Application March 29, 1946, Serial No. 658,163

9 Claims. (Cl. 73—355)

The general object of the present invention is to provide a practically effective radiation pyrometer adapted to accurately measure the temperature of bodies at relatively low temperatures, for example, at temperatures within the relatively low range of from 125° F. or lower, to 500° F.

More specific general objects of the present invention are to provide a radiation pyrometer adapted for use in measuring relatively low temperatures and including improved means for preventing or substantially minimizing measurement errors due to variations in ambient temperature, and errors due to the reception by the heat detecting or responsive element of the pyrometer of heat rays emitted by an extraneous object or objects other than the emitting object whose temperature is to be measured. In the use of a radiation pyrometer, variations in ambient temperature and the incidence of heat rays from extraneous objects tend to produce more serious errors in measuring relatively low temperatures than in measuring higher temperatures.

A prior radiation pyrometer devised by me is disclosed in Patent 2,357,193 of August 29, 1944, and a pyrometer constructed in accordance with the disclosure of that patent is now in successful commercial use in measuring furnace temperatures ranging from 800° F. upward, but is not adapted for use in measuring temperatures substantially lower than 800° F. A specific and practically important object of the present invention is to provide a pyrometer which is adapted for measuring relatively low temperatures and in which use is made of important features and characteristics of said pyrometer which have been found practically desirable and important in measuring furnace temperatures.

Said prior pyrometer discloses a heat responsive element in the form of a thermopile comprising a plurality of thermocouples with their hot junctions in a central radiation receiving portion, and their cold junctions in an annular outer portion of the thermopile which is in good heat conducting relation with a relatively massive pyrometer housing or body structure of good heat conductivity, so that the cold junctions of the thermopile are continuously maintained at approximately the temperature of the housing, notwithstanding the continuous conduction of heat to the cold junctions from the thermopile hot junctions in the normal use of the pyrometer in which the hot junctions are receiving heat rays from a body at a temperature substantially higher than the pyrometer body or housing. In said prior pyrometer, variations in hot and cold junction temperatures due to variations in ambient temperature are compensated for by the use of a compensating resistance having a positive temperature coefficient, which may be a nickel wire, and is connected in shunt to the thermopile. Such compensation while effective for relatively high temperature measurements is not practically effective in making relatively low temperature measurements.

The present invention may take various forms. Thus, for example, in one practically desirable embodiment of the present invention, use is made of a thermopile and pyrometer housing arrangement which may be identical with the thermopile and housing arrangement disclosed in my prior patent, but which includes heating means for maintaining the pyrometer body or housing element at a regulated temperature regardless of the variations in ambient temperature. In one form of the present invention, the regulated housing temperature maintained is a constant temperature higher than the expected maximum ambient temperature, and in another form of the invention, the temperature of the pyrometer housing is maintained substantially equal to the temperature being measured.

However, the present invention in its broader aspects, is not restricted to embodiment in the above-mentioned forms, but is adapted for use in embodiments in which the heat responsive element is not a thermopile. Thus, for example, the present invention may be embodied in a pyrometer in which the radiation receiver is an arm of a bolometer resistance bridge formed of nickel wire or other material varying in resistivity as its temperature is varied.

My present invention is characterized not only by the means employed to regulate the pyrometer housing temperature, but also by its means for transmitting to the receiving portion of the thermopile or other temperature responsive element of the pyrometer, of a relatively large amount of heat rays emitted by the hot body whose temperature is to be measured, while at the same time substantially eliminating the transmission to said element of heat rays emitted by extraneous objects.

In the forms of the present invention in which the pyrometer housing is normally maintained at a temperature which is the same as the temperature of the body which is measured, the last mentioned temperature may be readily measured indirectly, but accurately, by a thermocouple in contact with, and responsive to the temperature of the pyrometer housing.

The various features of novelty which characterize my invention are pointed out with particularity in the claims annexed to and forming a part of this specification. For a better understanding of the invention, however, its advantages and specific objects attained by its use, reference should be had to the accompanying drawings and descriptive matter in which I have illustrated and described preferred embodiments of the invention.

Figure 1:
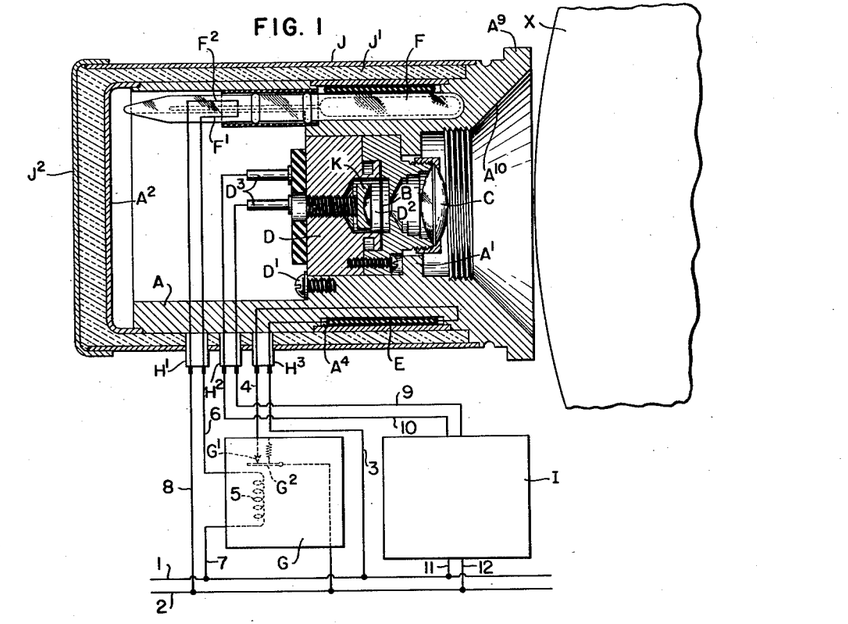
Fig. 1 is a view including a sectional elevation of a pyrometer structure and a diagrammatic representation of associated electrical heating and measuring apparatus.
Figure 2:
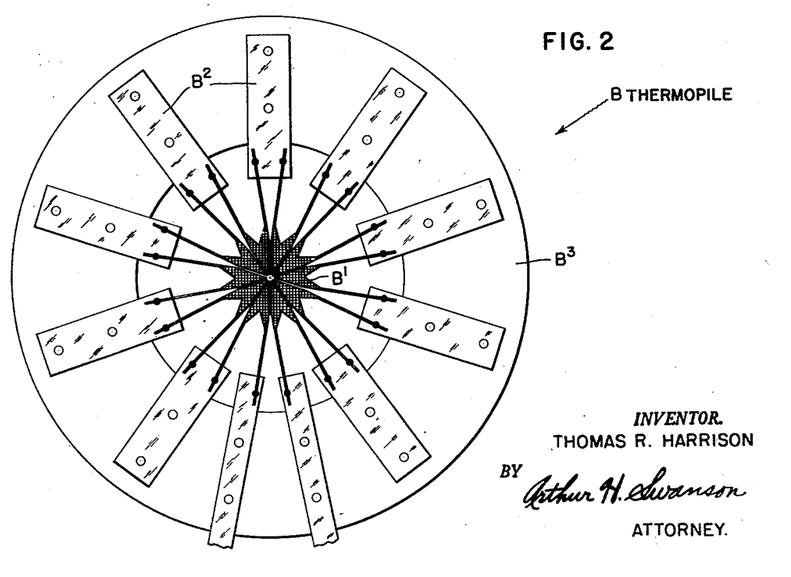
Fig. 2 is an elevation on an enlarged scale of a thermopile element of the pyrometer shown in Fig. 1.

In the embodiment of the invention illustrated in Figs. 1 and 2, the pyrometer comprises a relatively massive pyrometer housing or chambered body structure A, formed of aluminum or other good heat conducting metal. Mounted in the body A is a thermopile B and a suitable lens C for transmitting heat rays to the thermopile from a heated body X whose temperature is to be measured. As shown, the thermopile B is supported in a metallic thermopile housing or holder D having a cylindrical outer surface snugly received in a cylindrical seat formed in the body A and comprising an annular end wall formed by an internal flange portion A' of the body A. The front end of the holder D is clamped against the flange A', as by means of screws D'.

As shown in Fig. 2, the thermopile B comprises ten V-shaped thermocouples B' having their apices spaced around and in close proximity to the pyrometer axis. The two outer terminal leg portions of each thermocouple are in the form of relatively short wires each connected to a different one of eleven metal strips $B^2$. The latter are spaced radially at regular intervals around the pyrometer axis, and may be formed of constantan and be fastened to a mica sheet $B^3$ in the form of an annulus and constituting a supporting part of the thermopile terminal assembly. The strips $B^2$ may be secured to the mica sheet $B^3$ by flattened over extrusions formed in the strip $B^2$ and extending through suitable openings provided in the mica sheet $B^3$. The apex portions of the different thermocouples B' are flattened and collectively form the hot junctions or radiation receiving portion of the thermopile. The flattened hot junction portions of the thermocouples are blackened with aquadag and smoked or coated with lamp black to provide a surface which will readily absorb substantially all of the incident radiation. The terminal portion of the thermopile B is clamped between adjacent surfaces of the separable front and rear portions of the holder D, thin sheets of mica being interposed between each of said surfaces and the adjacent side of the thermopile terminal assembly.

In so far as above described, the pyrometer structure shown in Figs. 1 and 2 does not differ from the pyrometer structure shown and described in my prior patent. In particular, it is to be noted that the thermopile shown in Figs. 1 and 2 hereof, is like that of said prior patent in that the terminal wire portions of the thermocouples B' are relatively short, and so chosen as to provide a desirable and relatively high conduction factor, and in that the parts are so proportioned and arranged as to insure continuous temperature equality between the flat cold junction strips $B^2$ and the pyrometer housing or body structure A. The latter by reason of its relative massive form, and the good thermal conductivity of the metal of which it is composed, has all portions in proximity to the thermopile substantially uniform in temperature at all times. In consequence, the hot junctions of the thermopile B as well as its cold junctions, will respond completely to changes in the temperature of the housing body A with such rapidity that transient errors are made negligible while the housing is undergoing a change of temperature. As in said prior patent, the hot junction portion or radiation receiving portion of the thermopile, is located in a relatively small chamber $D^2$ formed in the holder D and open at one side to receive the heat rays coming through the open front end of the chambered body A and transmitted through the lens C to the thermopile.

For the purposes of the present invention, however, and as will become apparent as the description proceeds, it is not essential that the thermocouples B' have a relatively high conduction factor, nor is it essential for the cold junction strips to be maintained in good thermal contact with the pyrometer housing structure A. These factors which are of importance in the pyrometer structure disclosed in my prior patent are of less importance in the pyrometer embodying the principles of the present invention because the temperature of this pyrometer structure is maintained relatively constant by suitable temperature control means to be described.

Figure 3:
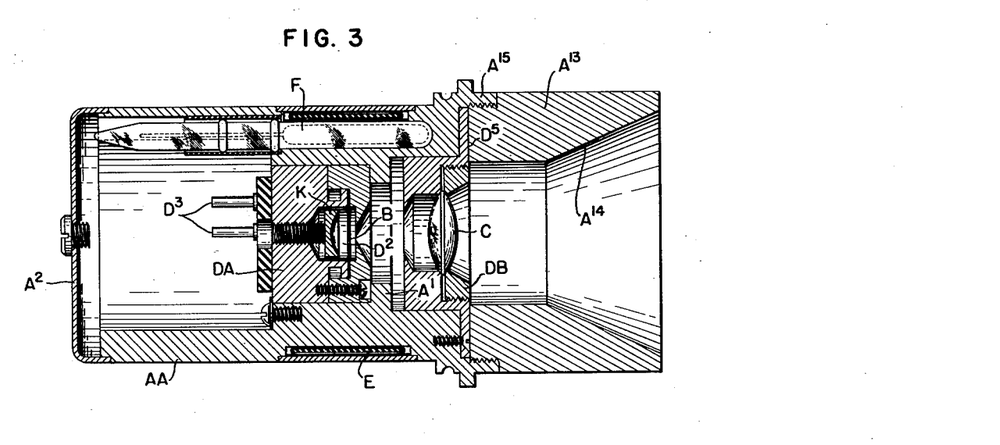
Fig. 3 is a sectional elevation of a modification of the pyrometer shown in Fig. 1.

As shown in Fig. 1, the lens C is mounted in an annular portion of the holder D, though it may be separately mounted in the pyrometer housing or body structure as shown in Fig. 3. However mounted, it is practically desirable that the lens mounting should be in good heat conducting relation with the pyrometer housing.

The lens C should be formed of material such as sodium chloride, potassium bromide, or calcium fluoride, adapted to pass a relatively large amount of the heat rays radiated by the low temperature body whose radiation is being measured.

As in my prior patent, the thermopile holder D supports binding posts $D^3$ respectively connected to the two metal plates $B^2$ which are each connected to one only of the thermocouples B'. The binding posts $D^3$ extend into a chamber space at the rear of the holder D and to which access is made possible by the removal of the housing end member $A^2$, detachably connected to the housing body A.

To adapt the pyrometer shown in Fig. 1 for use in measuring relatively low temperatures in accordance with the present invention, thermostating provisions are employed to automatically regulate the temperature of the pyrometer housing or body structure A. The thermostating provisions shown in Fig. 1 comprise a heating resistance element E for heating the body A, a thermostat F responsive to the temperature of the body A, and a controller G. The latter is actuated by the thermostat F to supply heating current to the resistance heating element E as required to maintain the pyrometer body A at the predetermined temperature, which is a constant temperature, for example 125° F., and is greater than the maximum expected ambient temperature.

The resistance element E may be of any known or suitable form, for example, it may consist of a resistance wire wound about a strip of asbestos or other flexible insulating material which is wrapped about the body A. As shown, the element E is received in a circumferentially extending recess or groove $A^4$ in the body A, with the external surfaces of the resistance wire covered by suitable insulation.

The thermostat F shown in Fig. 1 is in the form of a mercury thermometer received in a longitudinal groove formed in the peripheral portion of the body A. As shown, the glass envelope of the thermometer F has its outer side practically flush with the inner wall of the groove $A^4$ so that the thermometer will respond immediately to the heating action of the heating element E. The thermostat F includes contacts $F^1$ and $F^2$ which will or will not be bridged by the mercury in the thermostat, accordingly as the temperature of the latter is as great as or less than the predetermined temperature.

As diagrammatically shown in Fig. 1, the contacts $F^1$ and $F^2$ are connected to the terminals of a binding post H' mounted on the body A and extending away from the periphery of the latter at the rear of thermopile holder D. Similar binding posts $H^2$ and $H^3$ are mounted on the outer side of the body A alongside the binding post $H^1$. The terminals of the binding post $H^2$ are connected to the thermopile binding posts $D^3$ and the terminals of the resistance heating element E are connected to the terminals of the binding post $H^3$. Supply conductors 1 and 2 are the source of the heating current supplied to the element E.

The supply conductor 1 is directly connected through a branch conductor 3 to one terminal of the binding post $H^3$. The second terminal of that binding post is connected by conductor 4 to a switch terminal G' included in the controller G. The controller G includes a switch member $G^2$ connected to the supply conductor 2 and biased for movement into engagement with the contact G' to thereby complete an energizing circuit for the heating resistance element E. The switch element $G^2$ is held out of engagement with the contact G' by a relay winding 5 when the temperature of the body A is high enough to cause the mercury in the thermostat F to connect the contacts $F^1$ and $F^2$. To this end the contact of the binding post H' which is connected to the thermostat contact F' is connected by a conductor 6 to one terminal of the winding 5, and the second terminal of that winding is connected by a conductor 7 to the supply conductor 1. A conductor 8 connects the supply conductor 2 to the terminal of the binding post H' which is connected to the thermostat contact F².

As shown diagrammatically in Fig. 1, the terminals of the binding post H², and thereby the terminals of the thermopile B, are connected by conductors 9 and 10 to a recorder I which may be of any usual or suitable type for measuring and recording minute electromotive forces. For example, the recorder I may well be a self-balancing potentiometer including mechanism energized by the supply conductors 1 and 2 through branch conductors 11 and 12.

To facilitate the maintenance of the pyrometer body A at a predetermined temperature independent of the ambient temperature, the pyrometer body may well be surrounded by lagging J' of asbestos fibre or the like encased in a tubular body J which may well be formed of aluminum polished to reflect heat rays impinging on its outer surface. As shown, the metallic casing J includes an end member J² removable to provide access to, and to permit the removal of, the end portion A² of the pyrometer housing.

To substantially eliminate the incidence on the thermopile B of heat rays other than those emitted by the body X whose temperature is to be measured, the pyrometer body A is provided at its front end with a hollow projection A⁹ extending into proximity with the adjacent surface of the object X and formed with a conical internal reflecting surface A¹⁰. The outer surface of the projection A⁹ may be polished to reflect away from the pyrometer heat rays striking said surface. The base or larger end of said surface is adjacent the object X. The front edge of the projection A⁹ is advantageously spaced from the object X by a distance not greater than about five-eighths of an inch, or so, which is a small fraction only of the distance between the object X and the lens C. With such spacing, as those skilled in the art will understand, the heat rays emitted by the object X and passing into the space surrounded by the surface A¹⁰ would all be transmitted to the thermopile B if the surface A¹⁰ were a perfect reflector and if the lens C absorbed none of the heat radiated to it. In practice, of course, the surface A¹⁰ is not a perfect reflector, and not all of the heat reaching the outer surface of the lens will pass through the latter.

As previously stated, the measurement of relatively low temperatures with a radiation pyrometer presents serious problems which are not present, or at least which are less serious, in the use of a radiation pyrometer in measuring relatively high temperatures. The transfer of heat by radiation from a hotter body to a colder body, is, in accordance with the well known Stefan-Bolzmann law, proportional to the difference between the fourth powers of the absolute temperatures of the two bodies. In measuring furnace temperatures, the fourth power of the absolute temperature of the hot body is so much greater than the variations in the fourth power of the pyrometer temperature due to variations in the ambient atmosphere that ambient temperature variations are commonly disregarded, although they are not disregarded, but are compensated for, in the pyrometer of my prior patent. In those cases where such variations are disregarded, it is customary, in practice, to treat the amount of heat radiated by the hotter body as proportional to the fourth power of the absolute temperature of that body.

Variations in the temperature of a radiation pyrometer produced by ambient temperature variations cannot be disregarded, however, when the ambient temperature differs by a relatively small amount only, from the temperature being measured. In such case, pyrometer temperature variations produced by ambient temperature variations will result in serious measurement errors which cannot be avoided by the use of a simple compensating resistance as disclosed in my prior patent. In that patent a resistance formed of nickel or other material having a suitable positive temperature coefficient is connected in shunt to the terminals of the thermopile. While such compensation is effective in measuring relatively high temperatures which produce relatively large pyrometer temperature variations, such compensation is practically ineffective in the measurement of relatively low temperatures. As will be plainly apparent, variations in ambient temperature cannot produce measurement errors in the use of the apparatus shown in Fig. 1 since those variations do not produce significant variations in the pyrometer temperature.

In using a radiation pyrometer to measure relatively low temperatures, it is practically important to minimize the incidence on the radiation receiver of the pyrometer of heat radiation from extraneous objects for reasons analogous to those which make it desirable to prevent the radiation from being affected by variations in ambient temperature.

Furthermore, in measuring relatively low temperatures with a radiation pyrometer, it is advantageous to make the effect on the radiation receiver from the body whose temperature is to be measured, as large as is practically possible. To that result, the extraneous radiation shield formed by the projection A⁹, and the reflecting surface A¹⁰ both contribute. To that end also, an adjustable mirror K is placed back of the hot junction portion of the thermopile B, and the rear side of said portion is blackened and coated with lampblack, so that heat radiated from the rear side of the hot junction portion of the thermopile and through the joint spaces between the thermocouples B' will be reflected back to said hot junction portion.

In some low temperature measuring uses of a radiation pyrometer, there may be no need of providing a conical reflecting surface, such as the surface A¹⁰ of Fig. 1. In that case, the front end surface of the pyrometer housing may consist wholly or largely of a plane surface transverse to, and surrounding the pyrometer axis, such as the annular surface D⁵ of Figs. 3 and 9. In Fig. 3, the surface D⁵ is shown as covered by an annular front end part A¹³ detachably connected to the pyrometer body part AA, and formed with a conical inner reflecting surface A¹⁴ like the surface A¹⁰ of Fig. 1. The pyrometer shown in Fig. 3 may be used with the projection A¹³ in place when the temperature of a polished body, such as a calendering roll is being measured, and may be used with the projection A¹³ removed in measuring the temperature of a non-reflecting body, such as a strip of fabric. With the part A¹³ removed, the pyrometer lens and thermopile may be brought closer to the body whose temperature is to be measured.

In Fig. 3, the thermopile B and lens C are mounted in separate holders DA and DB, respectively, as is desirable in some cases. In Fig. 3, the surface D⁵ is the front surface of the relatively massive lens holder DB, and the part A¹³, when in use, is secured to the pyrometer body AA by threaded engagement of its base portion with a flange A¹⁵ which surrounds and extends forwardly of the surface D⁵.

Figure 4:
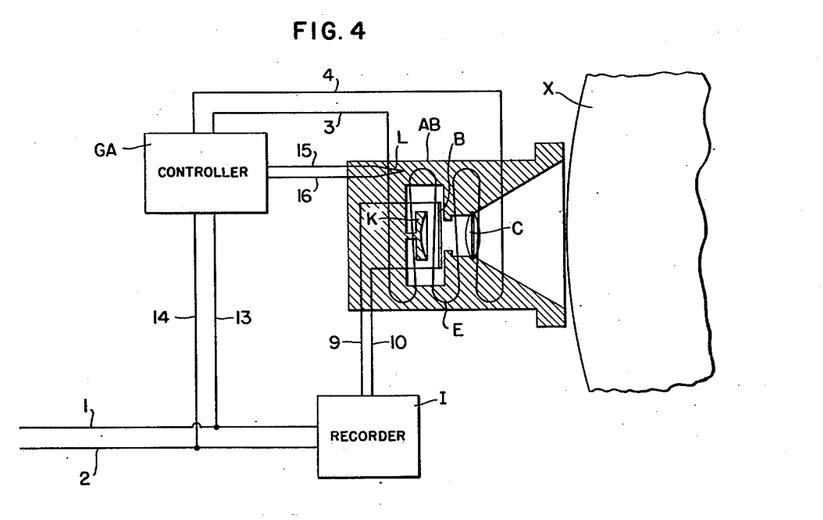
Figs. 4, 5, 6, and 7 are diagrammatic views showing different forms of electrical measuring and control apparatus associated with a pyrometer.

The thermostating means for regulating the temperature of a radiation pyrometer or body, may take other forms than that shown in Fig. 1, for example, in lieu of the thermometer type thermostat F shown in Fig. 1, use may be made of a thermocouple L having its hot junction suitably embedded in the pyrometer body AB, as diagrammatically illustrated in Fig. 4. In this case, the simple relay controller G shown in Fig. 1, may advantageously be replaced by a controller GA of any usual type employed to produce control effects in response to variations in a thermocouple voltage, such as a millivoltmeter or potentiometer controller. In Fig. 4, branch conductors 13 and 14 from the supply conductors 1 and 2, supply current to the controller GA to actuate the latter and to supply the current transmitted through the conductors 3 and 4 to the heater winding E, and the controller GA is connected to the thermocouple by conductors 15 and 16.

In the arrangements shown in Figs. 1, 3, and 4, wherein the temperature of the pyrometer body is maintained constant at some desired value, the extent to which the condition of black body radiation to the lens C from the object X is approached is determined by the reflection efficiency of the polished surfaces of the pyrometer body, from which radiant energy from the object X is reflected to the lens C, when the constant pyrometer body temperature is different from that of the object X. In the following arrangements of Figs. 5, 6, and 7, however, wherein the temperature of the pyrometer body is maintained at the temperature of the object X, approximate black body radiation to the lens C from the object X is insured regardless of the reflection efficiency of said polished surfaces, provided that radiation to the lens C from extraneous sources is prevented.

Figure 5:
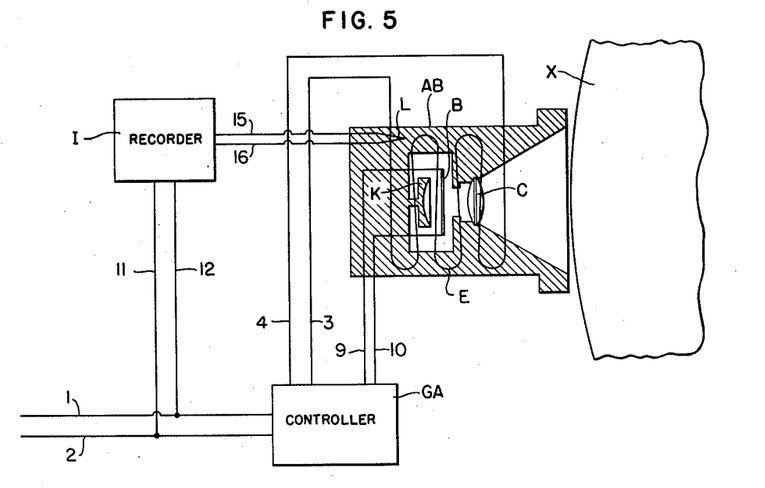

In Fig. 5, I have illustrated an arrangement in which the pyrometer housing or body AB, is normally maintained at the same temperature as the hot body X whose temperature is being measured, and in which a direct measure of the temperature of the housing AB provides an indirect but accurate measure of the temperature of the body X.

Thus, in Fig. 5 the terminals 15 and 16 of the thermocouple L having its hot junction embedded in the body AB are connected to the terminals of the recorder I just as the the terminals of the thermopile B are connected to the recorder I in Figs. 1 and 4. The controller GA of Fig. 5 may be exactly like the controller GA of Fig. 4, and its relay or regulator terminals may be connected to the terminals 3 and 4 of the resistance heater E as in Fig. 4. The controller GA is responsive to the difference between the hot and cold junction temperatures of the thermopile B, and is arranged to energize the resistance heater E as required to normally maintain the thermopile cold junctions at the same temperature as its hot junctions. With those temperatures equalized, the temperature of the pyrometer body AB will be exactly equal to the temperature of the hot body X, and the electromotive force of the thermocouple L, then transmitted to the recorder I, will be an accurate though indirect measure of the temperature of the body X.

Figure 6:
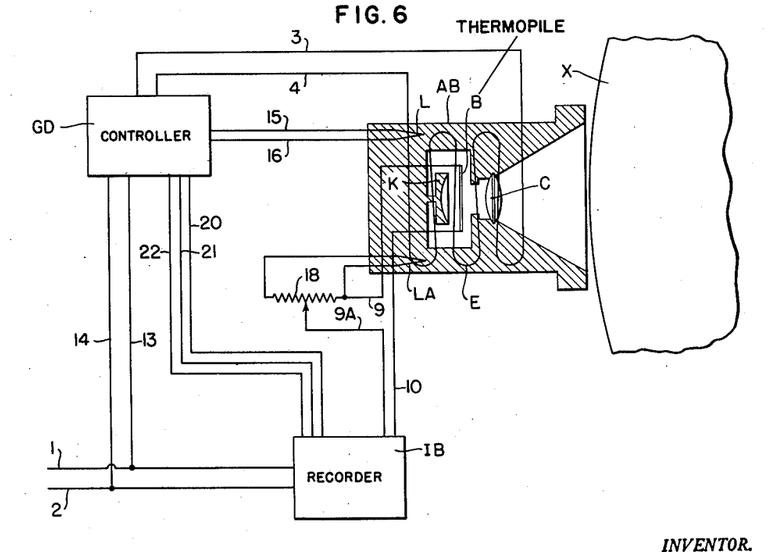

In Fig. 6, I have illustrated an arrangement in which a controller GD regulates the supply of current to the heater E and thereby tends to maintain the pyrometer body AB at the same temperature as the hot body X. In Fig. 6 the temperature of the hot body is measured by a recorder IB which may be a control potentiometer. The measuring circuit of the potentiometer controller IB includes the thermopile B and includes in series therewith a source of potential proportional to the temperature of the pyrometer body AB. As shown, that source of potential is the potential drop in an adjustable portion of a resistance shunt 18 connecting the terminals of a thermocouple LA having its hot junction embedded in the pyrometer body AB. The thermopile B has one terminal connected by the conductor 10 to one of the measuring circuit terminals of the potentiometer IB. The second terminal of the thermopile B is connected by the conductor 9 to one terminal of the thermocouple LA, and the second measuring circuit terminal of the potentiometer IB is connected by a conductor 9A to the resistance 18 at a variable intermediate point along the length of that resistance.

The controller GD tends to maintain the pyrometer body AB at the same temperature as the hot body X, and may well be a potentiometer controller including control point adjusting means controlled by the potentiometer recorder IB through the conductors 20, 21 and 22. Measuring and control potentiometers arranged to cooperate as do the instruments IB and GD are known, one such arrangement being disclosed, for example, in the Whitten Patent No. 2,343,392 of March 7, 1944. Further reference to the regulation of the control point adjustment of the controller GD by the potentiometer recorder IB is therefore unnecessary.

During periods in which the temperature of the hot body X is constant, the pyrometer body AB of Fig. 6 is maintained at the same temperature, in the same manner, as in Fig. 5, but when the temperature of the hot body changes rapidly, the temperatures of the hot body X and pyrometer body AB may differ. Each such temperature difference is necessarily attended by a difference between the temperatures of the hot and cold junctions of the thermopile B, and when the temperature of the hot body rises above or falls below the temperature of the pyrometer body AB, the thermopile B adds to, or subtracts from, the voltage impressed on the measuring circuit of the potentiometer recorder IB by the thermocouple LA, and thus compensates for the then existing difference between the temperatures of the hot body X and pyrometer body AB. For optimum results with the apparatus shown in Fig. 6, the sensitivities of the thermocouple LA and thermopile B should be suitably related, as by the use of shunts or voltage dividers, or by the selection of a suitable number of thermocouples and of suitable thermocouple materials.

Figure 7:
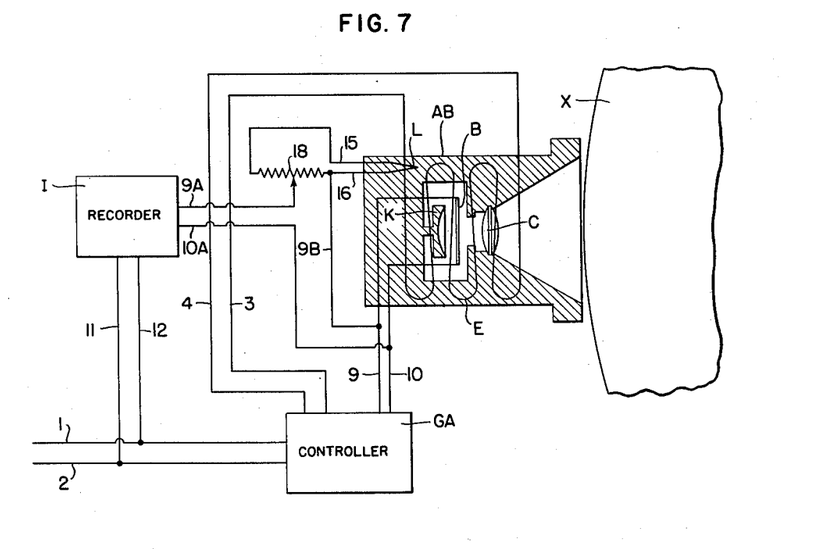

In Fig. 7 I have illustrated an arrangement in which a controller GA regulates the supply of current to the heater E and thereby tends to maintain the pyrometer body AB at the same temperature as the hot body X. The controller GA, to which the heater E is connected by conductors 3 and 4, may be of the same type as that specified in connection with the arrangement illustrated in Fig. 4. In Fig. 7 the temperature of the hot body is measured by a recorder I which may be of the same type as specified in connection with the arrangement of Fig. 1. The measuring circuit of the recorder I includes the thermopile B and includes in series therewith a source of potential proportional to the temperature of the pyrometer body AB. As shown, that source of potential is the potential drop across an adjustable portion of a resistance shunt 18 connected across the conductors 15 and 16 of a thermocouple L, having its hot junction embedded in the pyrometer body AB. The thermopile B has one terminal connected by the conductor 10A to one of the measuring circuit terminals of the recorder I, and this terminal of the thermopile B is also connected by a conductor 10 to one of the input terminals of the controller GA. The second terminal of the thermopile B is connected by a conductor 9B to the conductor 16 of the thermocouple L, and this terminal of the thermopile B is also connected by a conductor 9 to the other input terminal of the controller GA. The remaining measuring circuit terminal of the recorder I is connected by a conductor 9A to the slider of the variable resistance 18.

During periods in which the temperature of the hot body X is constant, the pyrometer body AB of Fig. 7 is maintained constant at the same temperature as the body X by the controller GA as in Figs. 5 and 6, but when the temperature of the hot body changes rapidly, the temperatures of the hot body X and the pyrometer body AB may differ temporarily. Each such temperature difference is necessarily attended by a difference between the temperatures of the hot and the cold junctions of the thermopile B, and when the temperature of the hot body rises above or falls below the temperature of the pyrometer body AB, the thermopile B adds to, or subtracts from, the voltage impressed on the measuring circuit of the recorder I by the thermocouple L, and thus compensates for the then existing difference between the temperatures of the hot body X and pyrometer body AB until such time as the controller GA and heater E will have caused the pyrometer body AB to reach the new temperature of the body X in response to the output voltage of the thermopile B. For optimum results with the apparatus shown in Fig. 7, the sensitivities of the thermocouple L and thermopile B should be suitably related, as in the arrangement illustrated in Fig. 6.

Figure 8:
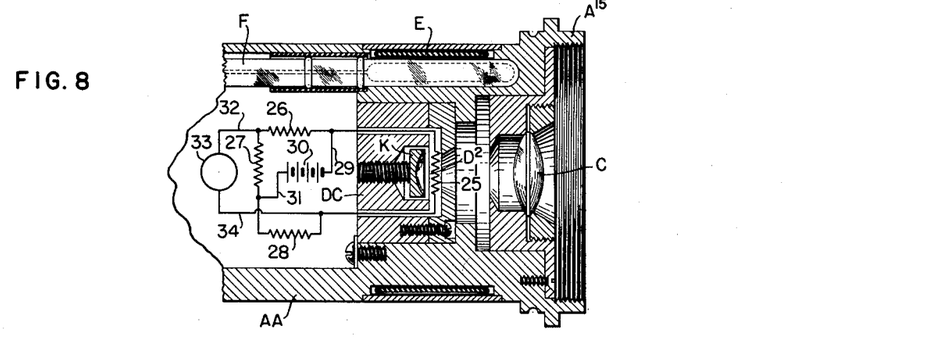
Fig. 8 is a somewhat diagrammatic representation of a pyrometer including a resistance bridge having one of its arms in heat conducting relation with its enclosing housing.

As previously stated, the general principles of the present invention may be used in radiation pyrometers in which the radiation responsive element is not a thermopile. Thus, for example, the radiation responsive element may be one arm of the resistance bridge of a bolometer as shown diagrammatically in Fig. 8. In that figure, a bolometer bridge comprising arms 25, 26, 27 and 28 is mounted in a pyrometer body AA, which, as shown, is like that shown in Fig. 3. The bridge arm 25 occupies the same position in the body AB as does the hot junction portion of the thermopile B of Fig. 3, and is formed of some material such as nickel which varies in resistance as its temperature varies. The bridge arm 26 which is connected to one end of the arm 25, is formed of the same material. The bridge arms 27 and 28 may be formed of some material such as constantan which does not vary in its resistance as its temperature varies. The bridge arm 26 is arranged out of the path of the heat rays passing through the lens C, and advantageously is in good heat conducting relation with the pyrometer body AA. The resistances of the arms 27 and 28 do not vary as their temperatures vary, and hence their temperature and location are not important.

The junction of the bridge arms 25 and 26 is connected by a conductor 29 to one terminal of a bridge energizing source of current 30. The other terminal of the source 30 is connected by conductor 31 to the junction of the bridge arms 27 and 28. The junction of the bridge arms 26 and 27 is connected by a conductor 32 to one terminal of a potential measuring device 33, and the latter has its other terminal connected by a conductor 34 to the junction of the bridge arms 25 and 28. The temperature of the housing body AA is regulated by thermostatic means which may take any of the forms hereinbefore described. As will be apparent, the apparatus shown in Fig. 8 will be substantially independent of changes in the ambient temperature when the temperature of the pyrometer body is maintained constant, as well as when it is kept equal to that of the hot body whose temperature is being measured.

The present invention may be used with advantage in measuring the temperature of a body within a furnace, and at a relatively low temperature. Thus, for example, as shown diagrammatically in Fig. 9, a radiation pyrometer may be mounted on top of a continuous furnace or tunnel kiln W heated by gas or oil burners Y in its side walls, and through which work bodies X are moved on a travelling conveyor or cars Z.

Figure 9:
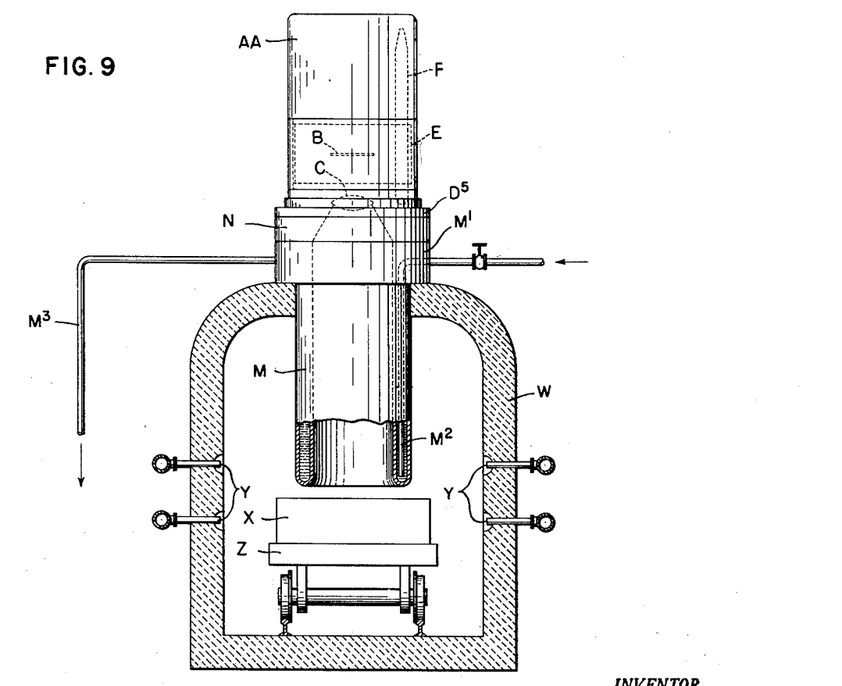
Fig. 9 is a diagrammatic representation of a furnace structure with which my improved pyrometer is employed.

The pyrometer shown by way of example in Fig. 9, comprises a body AA without the annular end projection A¹³ shown in Fig. 3, but the pyrometer employed, and associated control and recording apparatus, may take any of the forms hereinbefore described. To adapt the pyrometer to the use illustrated in Fig. 9, heat rays emitted by the body X below the pyrometer body AA, pass to the latter through a vertical pipe M mounted in and depending from the roof wall of the furnace with its lower end in proximity to the upper surface of said hot body X. As shown, the pipe M has double walls separated by a water space which opens at its upper end into an annular reservoir M′ directly above the furnace roof and between it and the open end of the pyrometer body AA. As shown, cooling water is supplied to the lower end of the water space in the pipe M through a valved supply pipe M², and after passing upward into the reservoir M′ is discharged through a drain pipe M³. A heat insulating body N is interposed between the top wall of the reservoir M′ and the lower end of the pyrometer.

In the operation of apparatus of the character shown in Fig. 9, the temperature of the body X measured by the pyrometer body AA, may be as low as 200° F. or lower, although portions of the wall burners Y radiating heat into the furnace chamber, may be at temperatures of 2000° F. or above. In such a furnace, the gas temperature in the furnace chamber may well be several hundred degrees higher than the temperature of the body X beneath the pipe M, particularly if the latter is located in the heating up end portion of the furnace. With the stated furnace and work temperatures, the top wall of the reservoir M′ may easily be kept below the desired temperature of the pyrometer body AA, whether that body is maintained at a constant temperature of 125° F. or so, or is maintained at the temperature of the body or bodies X, whose temperatures are measured.

In ordinary practice, the cooling action to which they are subjected should be adapted to keep the water cooled parts M and M′ at a temperature appreciably below the temperature at which the pyrometer body AA is to be maintained, so that the temperature of that body may be readily controlled by the associated thermostating provisions. The relatively low temperature at which the pipe M is maintained, prolongs the operative life of the latter. The pipe M also serves the useful purposes of substantially preventing radiation from the furnace wall burners Y, or other portions of the furnace structure from passing directly or by reflection from the work to the pyrometer. The pipe M also provides substantial protection against the passage of furnace gases into the pyrometer, and against smoke interference with the passage to the pyrometer of heat rays emitted by the body or bodies X whose temperatures are to be measured.

Although as has been made apparent, pyrometers constructed in accordance with the general principles of the present invention may take very different forms, one practical important advantage of the present invention is that it permits a radiation pyrometer adapted to make relatively low temperature measurements, to include desirable features of design and construction which have been found practically desirable in commercial pyrometers constructed in accordance with my prior patent and adapted for use in measuring relatively high temperatures.

While, in accordance with the provisions of the statutes, I have illustrated and described the best forms of embodiment of my invention now known to me, it will be apparent to those skilled in the art that changes may be made in the forms of the apparatus disclosed without departing from the spirit of my invention as set forth in the appended claims, and that in some cases certain features of my invention may be used to advantage without a corresponding use of other features.

Having now described my invention, what I claim as new and desire to secure by Letters Patent is:

1. A radiation pyrometer for detecting radiation, comprising in combination, a thermopile having a radiation receiver receiving radiation from a hot body whose temperature is being measured and a plurality of cold junctions and having structure in close thermal contact with the cold junctions and comprising a mass of solid material having high thermal conduction characteristics to insure uniformity of temperature throughout said structure to maintain the temperature of the cold junctions of said thermopile substantially the same as said structure irrespective of heat conducted thereto from the radiation receiver of said thermopile, a heater adjustable to control the temperature of the structure relative to the hot body, a device responsive to the difference between the hot and cold junction temperatures of said thermopile for regulating said heater as required to normally maintain said hot and cold junctions at the same temperature, temperature sensitive means responsive to the temperature of said structure, and means connected to said temperature sensitive means and to said thermopile and jointly responsive to the output of said temperature sensitive means and to said difference between the hot and cold junction temperatures of said thermopile.

2. In a radiation pyrometer for detecting radiation including a thermopile having a radiation receiver adapted to receive radiation from a source thereof and a plurality of cold junctions and having housing structure in close thermal contact with said cold junctions and comprising a mass of solid material having high thermal conduction characteristics to insure uniformity of temperature throughout said structure to maintain the temperature of said cold junctions of said thermopile substantially the same as the temperature of said structure irrespective of heat conducted thereto from said radiation receiver of said thermopile, the improvement which comprises a front end projection of said housing having a thick rear end portion in good heat transfer relation with the body portion of said housing and having an internal reflecting surface surrounding the pyrometer axis and spaced from the latter by a distance which increases as the distance from said radiation receiver increases, and means adapted to maintain the temperature of said structure substantially constant at a predetermined value, comprising heater means mounted in said housing and arranged in heat transfer relation with said structure, temperature responsive means mounted in said housing and arranged in heat transfer relation with said structure and adapted to be responsive to the temperature thereof, and means interconnecting said heater means and said temperature responsive means and adapted to regulate the operation of said heater means in response to the temperature of said structure as required to maintain the latter temperature substantially constant at a predetermined value, whereby the magnitude of an electrical output produced by said thermopile varies as a function of solely the temperature of said source.

3. In a radiation pyrometer for detecting radiation including a thermopile having a radiation receiver adapted to receive radiation from a source thereof and a plurality of cold junctions and having housing structure in close thermal contact with said cold junctions and comprising a mass of solid material having high thermal conduction characteristics to insure uniformity of temperature throughout said structure to maintain the temperature of said cold junctions of said thermopile substantially the same as the temperature of said structure irrespective of heat conducted thereto from said radiation receiver of said thermopile, the improvement which comprises a front end projection of said housing having a thick rear end portion in good heat transfer relation with the body portion of said housing and having an internal reflecting surface surrounding the pyrometer axis and spaced from the latter by a distance which increases as the distance from said radiation receiver increases, said front end projection being formed with a polished outer surface surrounding the pyrometer axis, and means adapted to maintain the temperature of said structure substantially constant at a predetermined value, comprising heater means mounted in said housing and arranged in heat transfer relation with said structure, temperature responsive means mounted in said housing and arranged in heat transfer relation with said structure and adapted to be responsive to the temperature thereof, and means interconnecting said heater means and said temperature responsive means and adapted to regulate the operation of said heater means in response to the temperature of said structure as required to maintain the latter temperature substantially constant at a predetermined value, whereby the magnitude of an electrical output produced by said thermopile varies as a function of solely the temperature of said source.

4. A radiation pyrometer for measuring the temperature of a hot body comprising in combination, a structure formed of metal of good heat conductivity and formed with a cavity open at one side of said structure so that when said one side is along side said hot body the latter may radiate heat into said cavity and may substantially prevent radiation of heat into said cavity from other sources, said structure being also formed with a thermopile chamber and with a passage through which heat is radiated from said cavity into said chamber, a thermopile in said chamber having its hot junction exposed to radiation through said passage and having its cold junctions in good heat transfer relation with said structure, a heating element regulable to control the relative temperatures of said structure and hot body, automatic control means connected to said thermopile to respond to a potential difference between the hot and cold junctions thereof and including means actuated by said potential difference for adjusting said heating element as required to equalize the temperatures of said structure and hot body, temperature sensitive means responsive to the temperature of said structure, and means connected to said temperature sensitive means and to said thermopile and jointly responsive to the output of said temperature sensitive means and to said potential difference between the hot and cold junctions of said thermopile.

5. In combination, an illuminator having a surface of substantial area, means supporting said illuminator surface in closely spaced relation with a portion of a work surface whose temperature is to be measured, a heater for said illuminator, means for controlling the energization of said heater to maintain said illuminator at a predetermined substantially constant temperature, radiant energy responsive means arranged to respond to the difference between said predetermined temperature and the temperature of said work surface and having a line of sight disposed concurrently to view by reflection the extended areas of opposed surfaces of said illuminator and the work, said illuminator surface having a peripheral area differing from the central area thereof for directing to said radiant-energy responsive means energy received by said peripheral area, and measuring means responsive to said difference between said predetermined temperature and the temperature of said work surface as a measure of the latter.

6. In combination, an illuminator having a surface of substantial area and in closely spaced relation with a portion of a work surface whose temperature is to be measured, a heater for said illuminator, means for controlling the energization of said heater to maintain said illuminator at a predetermined substantially constant temperature, radiant-energy responsive means arranged to respond to the difference between said predetermined temperature and the temperature of said work surface and having a line of sight disposed concurrently to view by reflection the extended areas of opposed surfaces of said illuminator and the work, said illuminator surface having a peripheral area differing from the central area thereof for directing to said radiant-energy responsive means energy received by said peripheral area, and measuring means responsive to said difference between said predetermined temperature and the temperature of said work surface as a measure of the latter.

7. A radiation pyrometer, comprising in combination a housing having structure of solid material characterized by good thermal conduction characteristics to insure uniformity of temperature throughout said structure, said housing also having a chamber portion and an opening into said chamber, a radiation receiver mounted in said chamber and adapted to receive heat radiation through said opening from a body of given emissivity whose temperature is to be determined through the medium of said radiation, said receiver being arranged in heat transfer relationship with said structure and cooperating with the latter to establish a temperature difference between said receiver and said structure which is a function of the difference between the fourth powers of the absolute temperature of said body and said structure, said receiver comprising a first temperature sensitive portion of a temperature sensitive device also having a second temperature sensitive portion mounted in said housing and arranged in heat transfer relation with said structure, and also having output terminals between which said device is adapted to produce an electrical effect of a magnitude which is dependent upon the said temperature difference between said receiver and said structure, and hence upon the said difference between the fourth powers of the absolute temperatures of said body and said structure, and means adapted to maintain the temperature of said structure substantially constant at a predetermined value, comprising heater means mounted in said housing and arranged in heat transfer relation with said structure, temperature responsive means mounted in said housing and arranged in heat transfer relation with said structure and adapted to be responsive to the temperature thereof, and means interconnecting said heater means and said temperature responsive means and adapted to regulate the operation of said heater means in response to the temperature of said structure as required to maintain the latter temperature substantially constant at a predetermined value, whereby the magnitude of said electrical effect varies as a function of solely the temperature of said body.

8. Apparatus as specified in claim 7, wherein said temperature sensitive device is a thermopile, wherein said first temperature sensitive portion is the hot junction structure of said thermopile, wherein said second temperature sensitive portion is the cold junction structure of said thermopile, and wherein said cold junction structure is arranged in close thermal relationship with said housing structure and is adapted to be maintained substantially at the temperature of the last mentioned structure.

9. In a radiation pyrometer for measuring the temperature of a body, comprising in combination a structure formed of metal of good heat conductivity and having an opening therein at one side of said structure so that when said one side is alongside said body a measuring zone is established between said one side and said body and the latter may radiate heat into said opening and may substantially prevent radiation of heat into said opening from other sources, said opening communicating with a chamber through a passage through which heat is radiated from said opening into said chamber, and a temperature sensitive device supported in said chamber, having a temperature sensitive radiation receiver exposed to radiation through said passage, and having a temperature sensitive portion in heat transfer relation with supporting means within said chamber, the improvement which consists in means adapted to insure blackbody measuring conditions in said zone, comprising heater means arranged in good thermal relationship with said structure, control means responsive jointly to the temperatures of said receiver and temperature sensitive portion and adapted to maintain equality between the temperatures of said structure and said body, including means adapted to connect said heater means to a source of energization therefor and to control the energization of said heater means and the temperature of said structure, temperature sensitive means responsive to the temperature of said structure, and means connected to said temperature sensitive means and to said temperature sensitive device and jointly responsive to the output of said temperature sensitive means and to the temperatures of said receiver and said temperature sensitive portion of said temperature sensitive device.

References Cited in the file of this patent
UNITED STATES PATENTS

| | | |
|---|---|---|
| 919,399 | Thwing | Apr. 27, 1909 |
| 1,901,209 | Vayda | Mar. 14, 1933 |
| 2,025,534 | Sheard et al. | Dec. 24, 1935 |
| 2,305,396 | Volochine | Dec. 15, 1942 |
| 2,349,436 | Keeler | May 23, 1944 |
| 2,357,193 | Harrison | Aug. 29, 1944 |
| 2,366,285 | Percy et al. | Jan. 2, 1945 |
| 2,369,624 | Vollrath | Feb. 13, 1945 |
| 2,562,538 | Dyer | July 31, 1951 |
| 2,690,078 | Phillips | Sept. 28, 1954 |

OTHER REFERENCES

Articles: (1) Hardy et al.: Review of Scientific Instruments, vol. 18, 1937, p. 420.

(2) Head, Victor P.: Radiation Pyrometry in Turbo-supercharger Testing, published in "Instruments," vol. 17, pp. 36–40, January 1944.

(3) Houghten et al.: Trans. Am. Soc. Heating and Ventil. Engrs., vol. 33 (1932), pp. 239, 240.

(4) Boyer et al.: Ind. & Eng. Chem., July 1926, p. 729.

(5) Roeser et al.: Bur. Stds. Jr. Research, vol. 5 (1930), pp. 796, 797.